United States Patent [19]

Hwa et al.

[11] Patent Number: 5,019,343

[45] Date of Patent: May 28, 1991

[54] CONTROL OF CORROSION IN AQUEOUS SYSTEMS USING CERTAIN PHOSPHONOMETHYL AMINES

[75] Inventors: Chih M. Hwa, Palatine; John A. Kelly, Crystal Lake, both of Ill.; Janet Neton, West Chester, Ohio; Patricia M. Scanlon, Arlington, Mass.; Roger R. Gaudette, Hudson, N.H.

[73] Assignee: W. R. Grace & Co.-Conn., New York, N.Y.

[21] Appl. No.: 452,153

[22] Filed: Dec. 15, 1989

[51] Int. Cl.$^5$ .............................................. C23F 11/08
[52] U.S. Cl. .................... 422/16; 252/8.555; 252/387; 252/388; 252/389.1
[58] Field of Search .............. 422/16; 252/8.555, 387, 252/388, 389.1, 389.21, 389.22, 389.23

[56] References Cited

U.S. PATENT DOCUMENTS

| | | | |
|---|---|---|---|
| 2,964,549 | 12/1960 | Ramsey et al. | 556/19 |
| 3,214,454 | 10/1965 | Blaser et al. | 556/18 |
| 3,336,221 | 8/1967 | Ralston | 210/700 |
| 3,474,133 | 10/1989 | Crutchfield et al. | 562/12 |
| 3,925,245 | 12/1975 | Harris et al. | 422/16 |
| 4,216,163 | 8/1980 | Sommer et al. | 552/13 |

OTHER PUBLICATIONS

"Cyclishe Intramolekulare Ester von Athanolamin-N-methylen-phosphonsauren"; Worms et al.; Zeitschrift fur anorganische und allgemeine Chemie, Band 381, 1971; pp. 260–265.
"The Direct Synthesis of α-Amino-methylphosphonic Acids"; Moedritzer et al.; Mannich–Type Reactions with Orthophosphorous Acid, May 1966; pp. 1603–1607.
"Hydrogen Peroxide Oxidation of Tertiary Amines"; Hoh et al.; Journal of the American Oil Chemists' Society, Jul. 1963 Issue vol. LV, No. 7; pp. 268–271.
"Recent Advances in Fatty Amine Oxides. Part I. Chemistry and Preparation"; Lake et al.; Journal of the American Oil Chemists' Society, Nov., 1963 Issue, vol. 40, No. 11 pp. 628–631.
"Analysis of Reaction Mixtures from the Hydrogen Peroxide Oxidation of Dimethyldodecylamine by the Preferred Method"; Dupont Technical Information.
"Detoxication Mechanisms II; The Iron Catalyzed Dealkylation of Trimethylamine Oxide"; Ferris et al.; Journal of the American Chemical Society/89:20/Sep. 27, 1967; pp. 5270–5275.
Kirk–Othmer, Encyclopedia of Chemical Technology; Third Edition, vol. 2, p. 259; John Wiley & Sons, New York, 1978-Amine Oxides.
"Chlorine–resistant, sequestering–dispersing agent-"-Sequion OA; Giovanni Bozzetto, pp. 10–12.

Primary Examiner—Robert J. Warden
Assistant Examiner—Laura E. Collins
Attorney, Agent, or Firm—James P. Barr

[57] ABSTRACT

This invention relates to a method for preventing corrosion and inhibiting the formation of scale deposition in aqueous systems. More specifically, it relates to using certain calcium insensitive phosphonomethyl amine compounds having the formula:

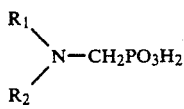

wherein either $R_1$ is selected from hydrogen, hydrocarbyl, hydroxy-substituted hydrocarbyl, alkoxy-substituted hydrocarbyl; and $R_2$ is selected from hydrocarbyl, hydroxy-substituted hydrocarbyl, alkoxy-substituted hydrocarbyl, carboxyl-substituted hydrocarbyl, $-CH_2PO_3H_2$, and $-C_2H_4N(CH_2PO_3H_2)_2$; or $R_1$ and $R_2$ together form an alicyclic ring having 3 to 5 carbon atoms, optionally along with oxygen atoms, phosphorus atoms or both oxygen and phosphorus atoms in the ring, and water soluble salts thereof.

9 Claims, No Drawings

CONTROL OF CORROSION IN AQUEOUS SYSTEMS USING CERTAIN PHOSPHONOMETHYL AMINES

FIELD OF THE INVENTION

This invention relates to controlling corrosion in aqueous systems and more particularly to using organic phosphonate compounds which are effective for controlling corrosion in aqueous systems.

BACKGROUND OF THE INVENTION

Iron and iron metal containing alloys such as mild steel are well-known materials used in constructing the apparatus of aqueous systems in which system water circulates, contacts the iron based metal surface, and may be concentrated, such as by evaporation of a portion of the water from the system. Even though such metals are readily subject to corrosion in such environments, they are used over other metals due to their strength and availability.

It is known that various materials which are naturally or synthetically occurring in the aqueous systems, especially systems using water derived from natural resources such as seawater, rivers, lakes and the like, attack iron based metals (the term "iron based metals" shall mean in the present disclosure and the appended claims iron metal and metal alloys containing iron therein, i.e. ferrous metals). Typical devices in which the iron metal parts are subject to corrosion include evaporators, single and multi-pass heat exchangers, cooling towers, and associated equipment and the like. As the system water passes through or over the device, a portion of the system water evaporates causing a concentration of the dissolved materials contained in the system. These materials approach and reach a concentration at which they may cause severe pitting and corrosion which eventually requires replacement of the metal parts. Various corrosion inhibitors have been previously used.

Chromates and inorganic phosphates or polyphosphates have been used in the past to inhibit the corrosion of metals which is experienced when the metals are brought into contact with water. The chromates, though effective, are highly toxic and, consequently, present handling and disposal problems. Phosphates are non-toxic. However due to the limited solubility of calcium phosphate it is difficult to maintain adequate concentrations of phosphates in many instances. The polyphosphates are also relatively non-toxic, but tend to hydrolyze to form orthophosphate which in turn like phosphate itself can create scale and sludge problems in aqueous systems (e.g. by combining with calcium in the system to form calcium phosphate). Moreover, where there is concern over eutrophication of receiving waters, excess phosphate compounds can provide disposal problems as nutrient sources. Borates, nitrates, and nitrites have also been used for corrosion inhibition. These too can serve as nutrients in low concentrations, and/or represent potential health concerns at high concentrations. In addition, environmental considerations have also recently increased concerns over the discharge of other metals such as zinc, which previously were considered acceptable for water treatment.

Much recent research has concerned development of organic corrosion inhibitors which can reduce reliance on the traditional inorganic inhibitors. Among the organic inhibitors successfully employed are numerous organic phosphonates. These compounds may generally be used without detrimentally interfering with other conventional water treatment additives.

Another serious problem in industrial water systems, especially in cooling water systems, industrial evaporators, and boilers is the deposition of scale, particularly scale-forming salts such as certain carbonates, hydroxides, silicates and sulfates of cations such as calcium and magnesium from aqueous solutions onto heat transfer surfaces. Much of water used in cooling water systems is supplied by the rivers, lakes, ponds, or the like and contains various amounts of scale-forming salts. In cooling tower systems, the cooling effect is achieved by evaporation of a portion of the circulating water in passing over the tower. Because of the evaporation which takes place in cooling, the solids in the water become concentrated. Moreover, because of the inverse solubility of calcium carbonate, calcuum sulfate and other hardness salts, the problem of the formation of water-insoluble scales on the heat transfer surfaces is intensified.

Various organic phosphonates have been considered for use in scale control. U.S. Pat. No. 3,336,221 discloses a method of inhibiting the precipitation of scale-forming salts in an aqueous system comprising adding to said system compounds having a methyl phosphonic acid bonded to a nitrogen atom such as amino tri(methylphosphonic acid). U.S. Pat. No. 3,214,454 teaches use of certain acylation products of phosphorous acid (e.g. hydroxyethylidene diphosphonic acid) for scale control. Unfortunately various phosphonates including hydroxyethylidene diphosphonic acid and amino(tri methylphosphonic acid)are very sensitive to calcium hardness and prone to form calcium phosphonate precipitates. U.S. Pat. No. 3,474,133 discloses that certain organo-phosphono-amine oxide compounds can be prepared by oxidizing organophosphono amine with a suitable oxidizing agent. For instance ethanol bis(dihydrogen phosphonomethyl) amine can be reacted with $H_2O_2$ to yield ethanol bis(dihydrogen phosphonomethyl) amine oxide (i.e. $HOCH_2CH_2N(O)(CH_2PO_3H_2)_2$); and tris(dihydrogen phosphonomethyl) amine can be reacted with $H_2O_2$ to yield tris(dihydrogen phosphonomethyl) amine oxide (i.e. $ON(CH_2PO_3H_2)_3$). It is disclosed that the organo-phosphono amine oxides have utility in practically all fields of organic chemistry wherein their acidic or salt and/or amine oxide properties can be utilized; and the various utilities indicated for the compounds in such fields include utility as sequestering or chelating agents, water treating agents, stabilizers for peroxy compounds and corrosion inhibitors. In particular, the acids and water soluble salts of the tris(phosphono lower alkylidene) amine oxides are reported to exhibit the property of being effective sequestering agents for metal ions in alkaline mediums. For example, the penta sodium salt of tris(dihydrogen phosphonomethyl) amine oxide is reported to sequester calcium ions in alkaline media in over a mole per mole basis. These tri(phosphono lower alkylidene) amine oxide compounds are considered very sensitive to calcium hardness and they are prone to form calcium phosphonate precipitates.

There is a continuing need for safe and effective water treating agents which can be used to control corrosion or to control scale formation, particularly in systems where substantial calcium is present in the system water.

SUMMARY OF THE INVENTION

We have found that the corrosion of metals in an aqueous system can be inhibited by exposing the metal to a calcium insensitive water-soluble phosphonomethyl amine compound selected from compounds having the formula

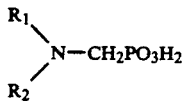

wherein either $R_1$ is selected from hydrogen, hydrocarbyl, and hydroxy-substituted, alkoxy-substituted, carboxylsubstituted, and sulfonyl-substituted hydrocarbyls; and $R_2$ is selected from hydrocarbyl, hydroxy-substituted, alkoxy-substituted, carboxyl-substituted, and sulfonyl-substituted hydrocarbyls, $—CH_2PO_3H_2$ and $—C_2H_4N(CH_2PO_3H_2)_2$; or $R_1$ and $R_2$ together form an alicyclic ring having 3 to 5 carbon atoms optionally along with oxygen and/or phosphorus atoms in the ring, and water-soluble salts thereof.

It is an object of this invention to provide corrosion control in aqueous systems.

It is another object of this invention to provide corrosion control using an agent which is considered calcium insensitive.

These and other objects and advantages of the present invention will become apparent from the detailed description of the invention which follows.

DETAILED DESCRIPTION

This invention relates to certain calcium insensitive phosphonomethyl amine compounds and their use as corrosion control agents for treating aqueous systems. Calcium sensitivity refers to the tendency of a compound to precipitate with calcium ions in solution. Calcium insensitivity is considered an important feature of this invention because it allows the agents of this invention to be used effectively in water of relatively high hardness. The test for calcium insensitivity of a compound as used in this application involves a cloud point test where the compound is added to a hard water containing 500 ppm calcium ion (as $CaCO_3$) which is buffered at pH 8.3 using 0.005M borate buffer and has a temperature of 60° C. The amount of compound which can be added until the solution becomes turbid (the cloud point) is considered to be an indicator of calcium sensitivity. This cloud point test will be referred to herein as the "CA500 cloud point test". The calcium insensitive compounds of this invention have cloud points of at least about 25 ppm as determined by the CA500 cloud point test. Preferred compounds have a cloud point of at least about 50 ppm; and the most preferred compounds have a cloud point of at least about 75 ppm as determined by the CA500 cloud point test because they are considered particularly versatile with regard to the water systems in which they can be effectively used.

Not all organo phosphonates, nor even all organo phosphono amine compounds, exhibit calcium insensitivity. The compounds of this invention are water-soluble phosphonomethyl amines having the formula

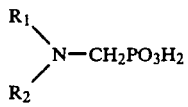

(and water-soluble salts thereof) which are calcium insensitive (i.e. have CA500 cloud points of at least about 25 ppm) wherein either $R_1$ is selected from hydrogen, hydrocarbyl, and hydroxy-substituted hydrocarbyl, alkoxy-substituted hydrocarbyl, carboxyl-substituted hydrocarbyl, and sulfonyl-substituted hydrocarbyl; and $R_2$ is selected from hydrocarbyl, hydroxy-substituted hydrocarbyl, alkoxy-substituted hydrocarbyl, carboxyl-substituted hydrocarbyl, sulfonyl-substituted hydrocarbyl, $—CH_2PO_3H_2$, and $—C_2H_4N(CH_2PO_3H_2)_2$; or $R_1$ and $R_2$ together form an alicyclic ring having 3 to 5 carbon atoms optionally along with oxygen atoms, phosphorus atoms or both oxygen and phosporus atoms in the ring, and water-soluble salts of said phosphonomethyl amines.

Hydrocarbyl includes alkyl, aryl and alkaryl groups which do not render the amine insoluble in water. Examples of hydrocarbyl groups are alkyl groups having from 1 to about 6 carbon atoms such as methyl, ethyl and cyclohexyl groups. Examples of hydroxy substituted hydrocarbyl groups are hydroxy substituted alkyl groups having from 1 to about 6 carbon atoms such as hydroxyethyl and hydroxyisopropyl groups. Examples of alkoxy-substituted hydrocarbyl groups are hydroxyalkyl groups having from 1 to about 6 carbon atoms which are alkoxylated with one to four units of ethylene oxide or propylene oxide such as a hydroxyethoxy ethyl group. Examples of carboxy-substituted hydrocarbyl are alkyl groups having from 1 to about 4 carbons which are substituted with a carboxylic acid group such as a carboxymethyl group. Examples of sulfonyl-substituted hydrocarbyl are sulfonyl-substituted alkyl groups having from 1 to about 4 carbon atoms such as a sulfonyl ethyl group. Examples of alicyclic rings formed by $R_1$ and $R_2$ together are rings where $R_1$ and $R_2$ together form the sequences $—CH_2CH_2OP(O)(OH)CH_2—$ or $—CH_2CH_2OCH_2CH_2—$.

Examples of the calcium insensitive water-soluble phosphonomethyl amines are N,N-bis-phosphonomethyl ethanolamine (i.e. $R_1$ is $—CH_2CH_2OH$ and $R_2$ is $—CH_2PO_3H_2$); N,N-bis-phosphonomethyl ethylamine (i.e. $R_1$ is $—C H$ and $R_2$ is $—CH_2PO_3H_2$); N,N-bis-phosphonomethyl-2-(hydroxyethoxy)ethylamine (i.e. $R_1$ is $—CH_2CH_2OCH_2CH_2OH$ and $R_2$ is $—CH_2PO_3H_2$); N,N-bis-phosphonomethyl taurine (i.e. $R_1$ is $—CH_2CH_2SO_3H$ and $R_2$ is $—CH_2PO_3H_2$); N,N-bis-phosphonomethyl glycine (i.e. $R_1$ is $—CH_2COOH$ and $R_2$ is $—CH_2PO_3H_2$); phosphonomethyl iminodiacetic acid (i.e. $R_1$ is $—CH_2COOH$ and $R_2$ is $—CH_2COOH$); phosphonomethyl diethanolamine (i.e. $R_1$ is $—CH_2CH_2OH$ and $R_2$ is $—CH_2CH_2OH$); 4-phosphonomethyl-2-hydroxy-2-oxo-1,4,2-oxazaphosphorinane (i.e. $R_1$ and $R_2$ together form an alicylic ring having $—CH_2CH_2OP(O)(OH)CH_2—$ and N,N,N'-tri-phosphonomethyl, N'-hydroxyethyl ethylene diamine (i.e. $R_1$ is $—CH_2CH_2OH$ and $R_2$ is $—C_2H_4N(CH_2PO_3H_2)_2$).

The calcium insensitive phosphonomethyl amines of the instant invention can be prepared by the known reaction of a nitrogenous material (ammonia, primary amines, secondary amines), a compound containing a carbonyl group (aldehyde or ketone) and orthophosphorous acid.

The water soluble salts are readily prepared from the phosphonomethyl amine by neutralizing the phosphonic acid group (and other acid groups) with a stoichiometric amount of a base or salt that contains essentially the desired cation. Bases and salts of acids such as those containing an alkali metal, alkaline earth metal, zinc, aluminum, ammonia and amines such as lower alkyl amines are especially suited, with sodium and potassium salts being preferred. For example, to make a sodium salt, a free acid of the phosphonomethyl amine can be neutralized with a stoichiometric amount of a base containing sodium cation, such as sodium hydroxide. It is noted however all of the acid hydrogens of the phosphonomethyl amines need not be replaced nor need the cation be the same for each acid hydrogen replaced. Thus the cation may be any one of, or a mixture of, $NH_4^+$, $H^+$, $Na^+$, $K^+$, etc.

Other bases or salts which can be reacted with the free acids to produce salt compounds of the instant invention include the inorganic alkali metal salts, oxides and hydroxides such as $Na_2O$, $Na_2CO_3$, $KOH$, $K_2O$, $K_2CO_3$, $LiOH$, $Li_2CO_3$, $CsOH$, $Cs_2CO_3$, other inorganic salts and hydroxides such as $Al(OH)_3$, $Al_2(SO_4)_3$, $Al(NO_3)_3$ and $ZnSO_4$ and amines, particularly low molecular weight amines (i.e. amines having a molecular weight below about 300), and more particularly the alkyl amines, alkylene amines and alkanol amines containing not more than 2 amine groups such as ethyl amine, diethylamine, propyl amine, propylene diamine, hexylamine, 2-ethyl hexylamine, N-butylethanol amine, triethanolamine and the like.

For the foregoing methods of preparation, reaction conditions such as temperatures, pH and time for reaction can be varied with the optimum conditions for the reactions being readily ascertained by those skilled in the art. Reference is made to U.S. Pat. No. 3,429,914, which is hereby incorporated herein in its entirety by reference, for a discussion of the preparation of organophosphono amines and their use in preparing organophosphonomethyl-amine oxides.

The tertiary phosphonomethyl amine, N,N-bis-phosphonomethyl taurine can be prepared by the known reaction of a nitrogenous material (i.e. taurine; $H_2N—CH_2CH_2SO_3H$) with a compound containing a carbonyl group (i.e. formaldehyde) and orthophosphorous acid. Reference is also made to U.S. Pat. No. 4,216,163 which is hereby incorporated herein in its entirety by reference, for guidance in reacting imino bis-methane phosphonic acid, sodium hydroxide and sodium isethionite to yield a corresponding product.

As other examples of phosphonomethyl amine preparation, N-phosphonomethyl iminodiacetic acid may be prepared by reacting phosphorous acid with paraformaldehyde and iminodiacetic acid; N,N-bis-phosphonomethyl 2-(hydroxyethoxy) ethylamine may be prepared by reacting 2-(hydroxyethoxy) ethylamine with phosphorous acid and formaldehyde; N,N-bis-phosphonomethyl ethylamine may be prepared by reacting ethylamine with phosphorous acid and formaldehyde; and 4-(phosphonomethyl)-2-hydroxy-2-oxo-1,4,2-oxazaphosphorinane may be prepared by reacting ethanolamine with phosphorous acid and formaldehyde.

These calcium insensitive water-soluble phosphonomethyl amine compounds have been found to be effective for inhibiting corrosion in aqueous systems.

In accordance with this invention, corrosion of iron-based metals which are in contact with the system water in aqueous systems may be inhibited by adding an effective amount of the calcium insensitive water-soluble phosphonomethyl amines of the invention (or their water-soluble salts) to the system water. The phosphonomethyl amines and their soluble alkali metal salts (usually the sodium salts) are preferred for this purpose.

The precise dosage of the phosphonomethyl amine or salt thereof depends, to some extent, on the nature of the aqueous system in which it is to be incorporated and the degree of protection desired. In general, however, it can be said the concentration maintained in the system water can be from about 0.05 to about 10,000 ppm. Within this range, generally low dosages of about 1000 ppm or less are normally preferred, with a dosage of about 200 ppm or less being most preferred for many aqueous systems (e.g. many open recirculating cooling water systems). Typically dosages of about 0.5 ppm or more are preferred, with a dosage of about 2 ppm or more being most preferred. The exact amount required with respect to a particular aqueous system can be readily determined in conventional manners. As with most aqueous systems, the pH is preferably maintained at 6 or above, and most preferably at 7 or above.

The phosphonomethyl amine or salt thereof may be added to the system water coming in contact with the metal surfaces of an apparatus by any convenient mode, such as by first forming a concentrated solution of the organophosphono amine or salt with water (preferably containing between 1 and 50 total weight percent of the organophosphono amines) and then feeding the concentrated solution to the system water at some convenient point in the system. In many instances the compounds may be added to the make-up or feed water lines through which water enters the system. For example, an injector calibrated to deliver a predetermined amount periodically or continuously to the make-up water may be employed.

The present invention is especially useful in the treatment of cooling water systems which operate at temperatures between about 60° F. and 200° F., particularly open recirculating cooling water systems which operate at temperatures of from about 80° F. to 150° F. The phosphonomethyl amines of this invention are considered especially effective in controlling corrosion in portions of the systems where the treated water is flowing past the metal surfaces being protected.

The compounds of this invention can be used to passivate metal surfaces.

The calcium insensitive phosphonomethyl amines of this invention are also considered effective for inhibiting the deposit of scale in aqueous systems, including in particular the deposit of scale derived from the system water and containing calcium carbonate, calcium sulfate, calcium phosphate, calcium silicate, magnesium carbonate, magnesium silicate, magnesium phosphate, and/or iron oxide on the metallic structuring of industrial water systems. Their use in controlling the deposit of calcium carbonate scale in cooling water systems is considered particularly advantageous. The threshold effect is exhibited whereby the formation of scale-forming salt crystals and their adherence to heat transfer surfaces is inhibited at low treatment levels.

The precise dosage of phosphonomethyl amine or salt suitable for controlling scale depends to some extent on the nature of the aqueous system in which it is to be incorporated and the degree of scale control desired.

However, in many instances the amount of phosphonomethyl amine added to inhibit corrosion will also inhibit scale formation in systems subject to both corrosion and scale problems. A typical concentration range for the calcium insensitive phosphonomethyl amine in such systems would be about 0.05 to 10,000 ppm with a concentration within the range of about 0.5 to 200 ppm often being suitable. The exact amount required with respect to a particular aqueous system can be readily determined in conventional manners and/or estimated from the alkalinity, pH, calcium concentration, dissolved solids and water temperature in the system. For most applications use of a substoichiometric amount is contemplated as sufficient to control scale formation (i.e. less than the amount required to sequester scale-forming cations such as calcium). Reference is made to U.S. patent application Ser. No. 97/451484, filed Dec. 15, 1989 for further discussion of scale control using certain phosphonomethyl amines.

It will be appreciated that while the phosphonomethyl amines of this invention may be used as the sole corrosion inhibitor for an aqueous system, other ingredients customarily employed in aqueous systems of the type treated herein can be used in addition to the subject phosphonomethyl amines. Other suitable water treatment additives include, for example, many biocides, polymeric agents (e.g. copolymers of 2-acrylamido-2-methylpropane sulfonic acid and methacrylic acid or polymers of acrylic acid or methacrylic acid), other phosphonates, yellow metal corrosion inhibitors (e.g. benzotriazole), other corrosion inhibitors and the like.

Practice of the invention will become further apparent from the following non-limiting examples.

EXAMPLE I

Calcium sensitivities the phosphonomethyl amines were respectively tested by the above-described CA500 cloud point test procedure for N,N,-bis-phosphonomethyl taurine, N-phoshonomethyl iminodiacetic acid, N,N-bis-phosphonomethyl-2-(hydroxyethoxy) ethylamine, 4-(phosphonomethyl)-2-hydroxy-2-oxo 1,4,2-oxazaphosphorinane, and N,N-bis-phosphonomethyl ethylamine.

In the test the phosphonates were respectively added to a 250-ml beaker containing hard water solutions having a temperature of 60° C., having a pH of 8.3, and containing 500 ppm calcium ion (as $CaCO_3$) and 0.005M borate buffer. In each case 100 ppm of the organophosphono amine was added without reaching the cloud point. For comparison, runs were made using amino tri(methyl phosphonic acid) and hydroxyethylidene diphosphonic acid, neither of which is considered a calcium insensitive compound of the present invention. The results are shown in Table A below.

TABLE A

| Run | Additive | Cloud Point (ppm) |
|---|---|---|
| 1 | N,N-Bis-phosphonomethyl taurine | >100 |
| 2 | N-Phosphonomethyl iminodiacetic acid | >100 |
| 3 | N,N-Bis-phosphonomethyl-2-(hydroxy-ethoxy) ethylamine | >100 |
| 4 | 4-(Phosphonomethyl)-2-hydroxy-2-oxo-1,4,2-oxazaphosphorinane | >100 |
| 5 | N,N-Bis-phosphonomethyl ethylamine | >100 |
| 6 | Amino tri(methylphosphonic acid) | 10 |
| 7 | Hydroxyethylidene diphosphonic acid | 7 |

EXAMPLE II

A test solution was formulated to approximate a 4-fold concentrate of Chicago tap water. The water had an initial pH of about 8.5. Two mild steel coupons were weighed and suspended for three days in an air-sparged sample of the solution at 54° C. The steel coupons were then removed and reweighed, and an average corrosion rate (in mils per year) over the three days was calculated on the basis of coupon weight loss. The results are provided in Table B below (Run 1). Three additional runs (Runs 2, 3 and 4) were made using the same procedure except that 15 ppm, 30 ppm, and 45 ppm of N,N-bis-phosphonomethyl taurine were respectively added to the test solution; another three additional runs (Runs 5, 6 and 7) were made using said procedure except that 15 ppm, 30 ppm and 45 ppm of 4-(phosphonomethyl)-2-hydroxy-2-oxo-1,4,2-oxazaphosphorinane were respectively added to the test solution; another run (run 8) was made using the same test procedure except that 15 ppm of N-phosphonomethyl iminodiacetic acid was added to the test solution; another three runs (runs 9, 10 and 11) were made using the same test procedure except that 15 ppm, 30 ppm and 45 ppm of N,N-bis-phosphonomethyl-2-(hydroxyethoxy) ethylamine were respectively added to the test solution, and another two runs (runs 12 and 13) were made using the same test procedure except that 15 ppm and 45 ppm of N,N-bis-phosphonomethyl ethylamine were respectively added to the test solution. The calculated coupon corrosion rates for these runs are also shown in Table B below.

TABLE B

| Run | Additive | Additive Concentration (ppm) | Corrosion Rate (mpy) |
|---|---|---|---|
| 1. | None | — | 48.0 |
| 2. | N,N-Bis-phosphonomethyl taurine | 15 | 13.6 |
| 3. | N,N-Bis-phosphonomethyl taurine | 30 | 8.4 |
| 4. | N,N-Bis-phosphonomethyl taurine | 45 | 4.2 |
| 5. | 4-(Phosphonomethyl)-2-hydroxy-2-oxo-1,4,2-oxazaphosphorinane | 15 | 11.8 |
| 6. | 4-(Phosphonomethyl)-2-hydroxy-2-oxo-1,4,2-oxazaphosphorinane | 30 | 7.6 |
| 7. | 4-(Phosphonomethyl)-2-hydroxy-2-oxo-1,4,2-oxazaphosphorinane | 45 | 7.0 |
| 8. | N-Phosphonomethyl iminodiacetic acid | 15 | 8.5 |
| 9. | N,N-Bis-phosphonomethyl-2-(hydroxyethoxy)ethylamine | 15 | 14.6 |
| 10. | N,N-Bis-phosphonomethyl-2-(hydroxyethoxy)ethylamine | 30 | 3.4 |
| 11. | N,N-Bis-phosphonomethyl-2-(hydroxyethoxy)ethylamine | 45 | 3.4 |
| 12. | N,N-Bis-phosphonomethyl ethylamine | 15 | 8.2 |
| 13. | N,N-Bis-phosphonomethyl ethylamine | 45 | 4.5 |

There was no pH control during the test of this example and the final pH of the test solutions after the three day test ranged from about 8.8 to 9.5.

EXAMPLE III

A potentiodynamic polarization test was conducted for demonstrating passivation by a solution of 30 ppm N,N-bis-phosphonomethyl taurine. In this test a disc of 1010 mild steel was polished to 600 grit finished, ultrasonically cleaned in soap water, and rinsed with acetone. The solution was subjected to argon deaeration to achieve an oxygen concentration of less than 0.5 ppm. The solution was adjusted to a pH of 8.5 by using sodium hydroxide or hydrochloric acid and heated to 55° C. by a water bath. The disc surface is reduced for 200 seconds at −1 volt against saturated calomel electrode. During the potentiodynamic polarization measurements, the potential is swept at 1 millivolt per second.

The potentiodynamic polarization test was also run for N,N-bis-phosphonomethyl ethanolamine. The results tabularized from the resulting curves are shown in Table C below. N,N-bis-phosphonomethyl ethanolamine has a cloud point of greater than 100 ppm as determined by the CA500 cloud point test.

TABLE C

| Potential (E) (Volts/Saturated Calomel Electrode) | Current Density (I) (Amperes/Square Meter) | |
|---|---|---|
| | N,N-Bis-phosphonomethyl taurine (30 ppm) | N,N-Bis-phosphonomethyl ethanolamine (30 ppm) |
| -0.99 | 3.64 | 4.20 |
| -0.95 | 2.79 | 2.95 |
| -0.90 | 1.47 | 1.85 |
| -0.85 | 0.71 | 0.92 |
| -0.80 | 0.25 | 0.39 |
| -0.76 | 0.15 | — |
| -0.75 | — | 0.01 |
| -0.70 | 0.22 | 0.24 |
| -0.65 | 0.42 | 0.49 |
| -0.60 | 0.79 | 0.75 |
| -0.55 | 1.26 | 1.06 |
| -0.50 | 1.46 | 1.16 |
| -0.48 | — | 1.09 |
| -0.45 | 1.58 | 0.95 |
| -0.42 | — | 0.88 |
| -0.40 | 1.85 | 0.88 |
| -0.38 | — | 0.96 |
| -0.35 | 3.09 | 1.14 |
| -0.30 | 4.64 | 1.50 |
| -0.25 | 7.51 | 2.34 |
| -0.20 | 13.56 | 3.77 |
| -0.15 | 28.80 | 6.43 |
| -0.10 | 37.10 | 8.04 |
| -0.05 | 48.30 | — |
| -0.01 | 57.60 | — |

Another run was made for N-phosphonomethyl iminodiacetic acid, and the tabularized results for this run are shown in Table D below.

TABLE D

| Potential (E) (Volts/Saturated Calomel Electrode) | Current Density (I) (Amperes/Square Meter) N-Phosphonomethyl iminodiacetic acid at 30 ppm |
|---|---|
| −0.845 | 0.339 |
| −0.821 | 0.135 |
| −0.797 | 0.019 |
| −0.773 | 0.159 |
| −0.749 | 0.317 |
| −0.725 | 0.458 |
| −0.701 | 0.569 |
| −0.677 | 0.692 |
| −0.653 | 0.755 |
| −0.629 | 0.806 |
| −0.605 | 0.830 |
| −0.597 | 0.886 |
| −0.589 | 0.888 |
| −0.581 | 0.885 |
| −0.573 | 0.916 |
| −0.565 | 0.940 |
| −0.557 | 0.981 |
| −0.549 | 0.973 |
| −0.541 | 0.978 |
| −0.533 | 1.004 |
| −0.525 | 0.984 |
| −0.513 | 0.989 |
| −0.505 | 0.982 |
| −0.497 | 1.007 |
| −0.489 | 1.055 |
| −0.481 | 1.111 |
| −0.473 | 1.161 |
| −0.449 | 1.452 |
| −0.425 | 1.815 |

An interval of relatively constant current density over a range of potential is considered indicative of passivation. The current densities over ranges −0.55 to −0.45, −0.48 to −0.40 and −0.557 to −0.541 respectively for N,N-bis-phosphonomethyl taurine, N,N-bis-phosphonomethyl ethanolamine and N-phosphonomethyl iminodiacetic acid are considered indicative of passivation of metal surfaces in the presence of these compounds.

EXAMPLE IV

The ability of the phosphonomethyl amines, N,N-bis-phosphonomethyl taurine, N-phosphonomethyl iminodiacetic acid, N,N,-bis-phosphonomethyl 2-(hydroxyethoxy) ethylamine, 4-(phosphonomethyl)-2-hydroxy-2-oxo-1,4,2-oxazaphosphorinane, and N,N-bis-phosphonomethyl ethylamine to also inhibit calcium carbonate formation was demonstrated using a threshold inhibitor test. In this test 800 ml of a test solution containing 400 ppm calcium (as Ca) and 400 ppm bicarbonate (as $HCO_3$) in a 1000 ml beaker was stirred with a magnetic stir bar and heated using a stainless steel immersion heater to 49° C. The pH was monitored during heating and kept at pH 7.15 with addition of dilute HCl. After the temperature of 49° C. was achieved, 0.1 N NaOH was added to the test solution at a rate of 0.32 ml/min using a syringe pump and rise in pH was monitored. A decrease or plateau in the rate of pH increase is observed when calcium carbonate starts to precipitate, and the pH at which this decrease or plateau is observed is termed the critical pH. The critical pH for the test solution is shown in Table E below along with the total milliequivalents per liter of hydroxide (as NaOH) added to reach the critical pH.

The procedure was repeated using test solutions to which 5 ppm of the respective calcium insensitive phosphonomethyl amine was added. Runs were also made using amino tri(methylphosphonic acid) and N,N-bis-phosphonomethyl ethanolamine. The results are shown in Table E below.

TABLE E

| Run | Additive | Critical pH | NaOH added to reach critical pH (meq/l) |
|---|---|---|---|
| 1 | Blank (without treatment) | 7.69 | 0.48 |
| 2 | N,N-Bis-phosphonomethyl taurine | 8.88 | 2.48 |

TABLE E-continued

| Run | Additive | Critical pH | NaOH added to reach critical pH (meq/l) |
|---|---|---|---|
| 3 | N-Phosphonomethyl imino-diacetic acid | 8.37 | 1.12 |
| 4 | N,N-Bis-phosphonomethyl 2-(hydroxyethoxy)ethylamine | 8.54 | 1.50 |
| 5 | 4-(Phosphonomethyl)-2-hydroxy-2-oxo-1,4,2-oxaza-phosphorinane | 8.15 | 0.84 |
| 6 | N,N-Bis-phosphonomethyl ethylamine | 8.30 | 1.09 |
| 7 | Amino tri(methylphosphonic acid) | 8.50 | 1.38 |
| 8 | N,N-bis-phosphonomethyl ethanolamine | 8.80 | 2.23 |

As shown in Table E, use of the phosphonomethyl amines of the present invention raised the critical pH and generally resulted in substantially more sodium hydroxide addition before the critical pH was reached. These phosphonomethyl amines are thus effective threshold inhibitors, capable of inhibiting calcium carbonate precipitation.

EXAMPLE V

Scale formation was further tested using an apparatus comprising a covered 28-liter basin,, a centrifugal pump which withdraws liquid from the bottom of the basin and circulates it through tubing respectively to a needle valve which allows flow control, a flow meter which allows flow measurement, a glass housing containing an immersion heater for heating the liquid which is returned to the basin. A cooling coil is provided in the basin and is connected such that tap water may be circulated through the cooling coil. The liquid temperature is controlled using a thermoregulator which activates a solenoid valve which controls the flow of tap water through the coil. A pH probe is also located in the basin and is operably connected to a pH controller which in turn controls a pair of solenoid valves which respectively control flow of 0.5 N NaOH and 0.2 N $H_2SO_4$ from 1-liter containers to the basin.

Five liters of test solution containing 600 ppm total hardness (as $CaCO_3$) was transfered to the basin and circulated at a flow rate of 1.4 ft. per second using the centrifugal pump. The pH was controlled within the range of 8.0–8.2 and the variable transformer was turned on such that the heat flux for the immersion heater was 10.9 KBTU per square foot per hour. The cooling coil was operated such that the outlet water from the basin was controlled at 60° C. After six hours the power transformer and the pH controller were turned off and the pH probe was removed from the basin. The water in the basin was cooled rapidly by resetting the thermoregulator to provide tap water circulation through the cooling coil. A sample of test solution was removed from the basin when it had cooled to 35° C., and it was analyzed for total hardness. The results are shown in Table F below. The reduction in total hardness was considered indicative of the scale formation in the system.

The run was repeated using the above procedure except that 2 ppm N,N-bis-phosphonomethyl taurine, a calcium insensitive phosphonomethyl amine, was added to the test solution prior to heating; another run was made using 10 ppm N,N-bis-phosphonomethyl-2-(hydroxyethoxy)ethylamine; and another run was made using 10 ppm 4-(phosphonomethyl)-2-hydroxy-2-oxo-1,4,2-oxazaphosphorinane. The total hardness of the test solution at the conclusion of the run is shown in Table F below, as is the reduction in total hardness, and the calculated inhibition of scale formation.

TABLE F

| Run | Additive | Test Solution Total Hardness (ppm) | | | Calculated Scale Inhibition % |
|---|---|---|---|---|---|
| | | Start | End | Change | |
| 1 | Blank (without treatment) | 600 | 134 | 466 | — |
| 2 | N,N-Bis-phosphonomethyl taurine (2 ppm) | 600 | 586 | 14 | 97.0 |
| 3 | N,N-Bis-phosphonomethyl-2-(hydroxyethoxy)ethylamine (10 ppm) | 600 | 511 | 89 | 80.9 |
| 4 | 4-(Phosphonomethyl)-2-hydroxy-2-oxo-1,4,2-oxazaphosphorinane (10 ppm) | 600 | 586 | 14 | 97.0 |

The Examples encompass particular embodiments of the invention. Other embodiments will become apparent to those skilled in the art from a consideration of the specification or practice of the invention disclosed herein. It is understood that modifications and variations may be produced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A process for inhibiting corrosion of an iron based metal in contact wit the system water in an aqueous system consisting essentially of the step of incorporating into the system water an effective amount of a water soluble phosphonomethyl amine having the formula:

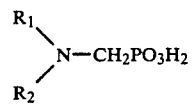

wherein either $R_1$ is selected from hydrogen, hydrocarbyl, and hydroxy-substituted, alkoxy-substituted, carboxyl-substituted, and sulfonyl-substituted hydrocarbyl; and $R_2$ is selected from hydrocarbyl, hydroxy-substituted, alkoxy-substituted, carboxyl-substituted, sulfonyl-substituted hydrocarbyl, —$CH_2PO_3H_2$, and —$C_2H_4N(CH_2PO_3H_2)_2$; or $R_1$ and $R_2$ together form an alicyclic ring having 3 to 5 carbon atoms in the ring; and having a cloud point of at least about 25 ppm as determined by the CA500 cloud point test or a water soluble salt of said phosphonomethyl amine.

2. The process of claim 1 wherein the phosphonomethyl amine or an alkali metal salt thereof are added to the system water.

3. The process of claim 1 wherein the phosphonomethyl amine has a cloud point of at least about 50 ppm as determined by the CA500 cloud point test.

4. The process of claim 1 wherein the phosphonomethyl amine is selected from the group consisting of N,N-bis-phosphonomethyl-2-(hydroxyethoxy) ethylamine, 4-(phosphonomethyl)-2-hydroxy-2-oxo-1,4,2,-oxazaphosphorinane, N-phosphonomethyl iminodiacetic acid, N,N-bis-phosphonomethyl taurine and N,N-bis-phosphonomethyl ethylamine and their water soluble salts.

5. The process of claim 4 wherein said phosphonomethyl amine is added in an amount effective to inhibit the formation of scale in the system.

6. A process for passivating iron surfaces in an aqueous system to inhibit corrosion thereof consisting essentially of the step of adding to the system water an effective amount of a water soluble phosphonomethyl amine having the formula:

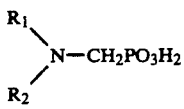

wherein either $R_1$ is selected from hydrogen, hydrocarbyl, and hydroxy-substituted, alkoxy-substituted, carboxyl-substituted, and sulfonyl-substituted hydrocarbyl; and $R_2$ is selected from hydrocarbyl, hydroxy-substituted, alkoxy-substituted, carboxyl-substituted, sulfonyl-substituted hydrocarbyl, $-CH_2PO_3H_2$, and $-C_2H_4N(CH_2PO_3H_2)_2$; or $R_1$ and $R_2$ together form an alicyclic ring having 3 to 5 carbon atoms in the ring; and having a cloud point of at least about 25 ppm as determined by the CA500 cloud point test or a water soluble salt of said phosphonomethyl amine.

7. The process of claim 6 wherein the phosphonomethyl amine is selected from the group consisting of N,N-bis-phosphonomethyl taurine, N,N-bisphosphonomethyl ethanolamine, N-phosphonomethyl iminodiacetic acid and their water soluble salts.

8. A process for inhibiting corrosion of an iron based metal in contact with the system water in an aqueous system comprising the step of incorporating into the system water an effective amount of N,N-bis-phosphonomethyl-2-(hydroxyethoxy)ethylamine or its water soluble salt, having a cloud point of at least 25 ppm as determined by the CA500 cloud point test.

9. A process for inhibiting corrosion of an iron based metal in contact with the system water in an aqueous system comprising the step of incorporating into the system water an effective amount of 4-(phosphonomethyl)-2-hydroxy-2-oxo-1,4,2-oxazaphosphorinane or its water soluble salt, having a cloud point of at least 25 ppm as determined by the CA500 cloud point test.

* * * * *